(12) United States Patent
Greffet et al.

(10) Patent No.: US 11,726,222 B2
(45) Date of Patent: Aug. 15, 2023

(54) SEISMIC MARINE VIBRATOR

(71) Applicant: KIETTA, Marseilles (FR)

(72) Inventors: Denis Greffet, Marseilles (FR); Luc Haumonte, Marseilles (FR); Michel Manin, Sainte Mesme (FR)

(73) Assignee: KIETTA

( * ) Notice: Subject to any disclaimer, the term of this patent is extended or adjusted under 35 U.S.C. 154(b) by 294 days.

(21) Appl. No.: 17/041,979

(22) PCT Filed: Mar. 28, 2019

(86) PCT No.: PCT/EP2019/057855
§ 371 (c)(1),
(2) Date: Sep. 25, 2020

(87) PCT Pub. No.: WO2019/185793
PCT Pub. Date: Oct. 3, 2019

(65) Prior Publication Data
US 2021/0018635 A1      Jan. 21, 2021

(30) Foreign Application Priority Data

Mar. 29, 2018 (FR) ...................... 1852768

(51) Int. Cl.
*G01V 1/145* (2006.01)
(52) U.S. Cl.
CPC .................... *G01V 1/145* (2013.01)
(58) Field of Classification Search
CPC .......... G01V 1/00; G01V 1/001; G01V 1/003; G01V 1/005; G01V 1/006; G01V 1/008; G01V 1/02; G01V 1/04; G01V 1/053; G01V 1/06; G01V 1/116; G01V 1/143; G01V 1/145; G01V 1/147; G01V 1/153; G01V 1/155; G01V 1/28; G01V 1/282; G01V 1/284; G01V 1/288; G01V 1/30; G01V 5/00; G01V 9/00; G01V 11/00;
(Continued)

(56) References Cited

U.S. PATENT DOCUMENTS

| 4,387,451 | A | * | 6/1983 | Wilcox | ................. | G01V 1/145 367/142 |
| 4,633,970 | A | * | 1/1987 | Mifsud | ................. | G01V 1/145 181/402 |
| 6,230,840 | B1 | * | 5/2001 | Ambs | ..................... | G01V 1/38 367/141 |
| 6,464,035 | B1 | * | 10/2002 | Chelminski | ........... | G01V 1/135 367/75 |
| 2004/0196737 | A1 | * | 10/2004 | Nicholson | ........... | G01V 1/3826 367/16 |

(Continued)

*Primary Examiner* — Daniel L Murphy
*Assistant Examiner* — Amie M Ndure
(74) *Attorney, Agent, or Firm* — Norton Rose Fulbright US LLP

(57) ABSTRACT

A seismic marine vibrator (100) may comprises first plates (102) and second plates (104) arranged along a longitudinal axis (101), longitudinal and peripheral first (106) and second (108) elements respectively secured to the first (102) and second (104) plates, and an actuator (112) operable to reciprocate the first elements (106) relative to the second elements (108) along the longitudinal axis (101) so as to reciprocate the first plates (102) relative to the second plates (104). The seismic marine vibrator further comprises peripherally closed air-filled chambers (109) and peripherally open chambers (111), the volume of said open chambers (111) being varied when the first plates (102) are reciprocated so as to take in and expel water radially to generate an acoustic wave. This forms an improved seismic marine vibrator.

21 Claims, 5 Drawing Sheets

(58) Field of Classification Search
CPC .............. G01V 13/00; G01V 2200/00; G01V 2210/00; G01V 1/3817; G01V 1/3808; G01V 1/3861; G01V 2210/1293; G01V 1/38; G01V 2210/1214; G01V 1/135; G01V 1/188; G01V 1/3826; G10K 9/121; G10K 9/122; G10K 9/125; G10K 9/13; G10K 9/16; G10K 9/18; G10K 15/00; G10K 2200/00; G10K 15/02; G10K 15/04; G10K 15/08; B06B 1/0276; B06B 1/00; B06B 1/045; B06B 1/02; G01H 3/00; G01H 5/00; G01H 13/00; G01H 15/00; G01H 17/00
See application file for complete search history.

(56) References Cited

U.S. PATENT DOCUMENTS

| | | | | |
|---|---|---|---|---|
| 2012/0069702 | A1* | 3/2012 | Muyzert | G01V 1/3808 367/15 |
| 2013/0322212 | A1* | 12/2013 | Pica | G01V 1/303 367/38 |
| 2014/0056109 | A1* | 2/2014 | Norton, III | G01V 1/3817 367/144 |
| 2016/0047923 | A1* | 2/2016 | Kröling | G01V 1/159 181/120 |
| 2016/0084979 | A1* | 3/2016 | Andersen | G01V 1/153 367/7 |

* cited by examiner

SEISMIC MARINE VIBRATOR

CROSS-REFERENCE TO RELATED APPLICATIONS

This application is a national phase application under 35 U.S.C. § 371 that claims priority to International Application No. PCT/EP2019/057855, filed Mar. 28, 2019, which claims priority to France Patent Application No. 1852768, filed Mar. 29, 2018, both of which are incorporated by reference herein in their entirety.

FIELD OF THE INVENTION

The present invention relates to the field of seismic marine vibrators, for example for acoustic wave generation in marine mediums (e.g. sea, lake or other aquatic zones), for example during seismic prospection.

BACKGROUND

Seismic prospection in aquatic mediums is conventionally performed by providing a set of parallel submerged seismic cables carrying a plurality of sensors (hydrophones or hydrophone/geophone combinations) spaced apart along the cables. A source capable of creating an acoustic wave in the medium may be provided at a distance from the seismic cables, for example towed by vessel. The wave thus formed propagates to the water bottom then further to the underlying subsoil. This gives rise to reflections at the interfaces between geological layers forming the subsoil, which are collected by sensors of the submerged seismic cables. All of the information may then be processed to produce a three-dimensional (3D) image of different geological layers of the subsoil, generally used to determine the presence of hydrocarbon reservoirs. For example, document FR2940838A1 discloses a seismic prospection technique in which a set of parallel submerged seismic cables of neutral buoyancy are positioned midwater, and each cable is connected to respective surface autonomous recording vessels (hereinafter "RAVs"), sometimes called "drones", at each of its two ends. Each cable is subject to a tension exerted at its ends by the RAVs in opposite directions, so that the cables can be kept stationary or quasi-stationary during the acquisition of seismic signals. Other examples of seismic prospection techniques may comprise towing the seismic cables using vessels or using ocean bottom cables with sensors deep underwater. Other examples may comprise ocean bottom nodes, the nodes having sensors configured to sense seismic waves. In other examples, the nodes may be autonomous nodes.

Existing sources capable of generating acoustic waves in aquatic mediums comprise marine vibrators and airguns. Airguns are impulsive sources capable of almost instantaneously generating high energy waves. However, the impact that airguns have on the marine ecology of prospecting zones has come into question. Marine vibrators are considered less harmful towards the marine environment. Marine vibrators generate waves by displacing water at given frequencies.

For example, document U.S. Pat. No. 6,464,035 discloses an example of a marine vibrator comprising an elongated circular cylinder. The elongated circular cylinder has a plurality of cylinder chambers therein including an actuator cylinder chamber. The elongated circular cylinder has a plurality of ports therein at each of the cylinder chambers. The ports open out to an elongated annular bladder chamber for providing water communication. The communication is provided between each cylinder chamber and water in the elongated annular bladder chamber. The marine vibrator also comprises an axially reciprocable piston in each of the cylinder chambers. The marine vibrator also comprises an elongated piston rod connected to the pistons and extending along the axis. The marine vibrator also comprises an actuator piston in the actuator cylinder chamber connected to the elongated piston rod. The marine vibrator axially vibrates the actuator piston, axially vibrating the pistons, vibrating water out and in through the ports, radially vibrating the elastomeric bladder propagating vibratory seismic energy from the outer surface of the bladder. However, water vibrated out and in through the ports is accompanied by cavitation effects. Cavitation limits the power output of marine vibrators and affects the intensity of generation of waves. Furthermore, a part of the volume inside the cylinder chambers is occupied by the axially reciprocable piston. This reduces the amount of water that can vibrate out and in through the ports. This thus further limits the energy of generated waves. Furthermore, the device presents a complex structure, necessitating sealing elements between moving parts, which leads to reliability and maintenance issues.

Within this context there is still a need for an improved marine vibrator.

SUMMARY OF THE INVENTION

It is therefore provided a seismic marine vibrator. The marine vibrator comprises a plurality of first plates. The first plates are arranged along a longitudinal axis. The marine vibrator also comprises a plurality of second plates. The second plates are also arranged along the longitudinal axis. The first plates alternate with the second plates. The marine vibrator also comprises longitudinal and peripheral first elements. The first elements are angularly distributed about the longitudinal axis. The first elements are secured to the first plates. The marine vibrator also comprises longitudinal and peripheral second elements. The second elements are angularly distributed about the longitudinal axis. The second elements are secured to the second plates. The marine vibrator also comprises an actuator. The actuator is operable to reciprocate the first elements relative to the second elements. The reciprocation of the first elements relative to the second elements is performed along the longitudinal axis so as to reciprocate the first plates relative to the second plates. The marine vibrator also comprises peripherally closed air-filled chambers. The peripherally closed air-filled chambers are defined between respective first pairs of adjacent plates. The marine vibrator also comprises peripherally open chambers. The peripherally open chambers are defined between respective second pairs of adjacent plates. The second pairs of adjacent plates alternate with the first pairs of adjacent plates. The volume of the open chambers is varied when the first plates are reciprocated. The volume of the open chamber is varied so as to take in and expel water radially to generate an acoustic wave.

Such a marine vibrator improves the generation of acoustic waves.

Notably, the acoustic waves generated by the marine vibrator are less harmful to the marine environment than acoustic waves generated by airguns.

In addition, the peripherally open chambers are defined between respective second pairs of adjacent plates, meaning that the surface of water exchange between each respective open chamber and the outside marine environment corresponds substantially to the surface delimited by the peripheral edges of the two adjacent plates defining the respective open chamber. Thus, the water exchange may be performed substantially fully peripherally and with substantially no obstruction, except for the relatively little obstruction potentially caused by the peripheral first and second elements. Also, the area of the surface of water exchange changes as the adjacent plates are reciprocated. As a consequence, cavitation in the marine vibrator is reduced. Furthermore, the open chambers may present relatively few salient angles, thereby further limiting cavitation.

In addition, the first elements and the second elements respectively secured to the first and second plates support the structure of the marine vibrator. Thus, the volume inside of the peripherally open chambers may be unoccupied by any structure, but occupied only by water. Consequently, the entire surface of the first plate and second plate inside the peripherally open chamber are in contact with the water. This improves efficiency. Alternatively or additionally, the volume inside the peripherally closed air-filled chambers may be unoccupied by any structure, but occupied only by air. This facilitates manufacturing, and notably airtight sealing of the peripherally closed air-filled chambers.

The marine vibrator may comprise, between the two plates of one or more (e.g. all) first pairs, an elastic membrane closing the respective peripherally closed chambers. The first plates and/or second plates may be rigid, semi-rigid, and/or present a rigidity significantly higher than the elastic membrane. The peripherally closed air-filled chambers are thus maintained airtight. The airtight connection between a plate of a first pair of plates and a respective elastic membrane may be fixed relative to the plate during the reciprocation of a first plate relative to a second plate. Therefore, a manufacturing ensuring airtightness of the closed chambers of the marine vibrator during the generation of acoustic waves is simple to perform. The first and second elements may support the chambers such that the chambers are aligned.

In examples, the actuator of the marine vibrator is operable to reciprocate the first elements relative to the second elements at different frequencies. The reciprocation may be performed within a predetermined frequency sweep. The reciprocation distance (i.e. the amplitude of the distance over which the first elements move relative to the second elements) varies such that it increases as the frequency decreases, for example inversely of the squared frequency on a portion of the frequency interval. In other words, the reciprocation distance increases (respectively decrease) as the frequency decreases (respectively increases). Frequency sweeps allow the generation of multiple acoustic waves with different frequencies. For example, in seismic prospection acoustic waves of different frequencies may penetrate more or less geological layers before being reflected depending on the frequency. Thus, the reflected acoustic waves carry different information. The marine vibrator is thus not limited to one single operative frequency.

The marine vibrator may present any one or more of the following features:
- at least one peripheral opening on the peripherally open chambers presents a symmetry of revolution with respect to the longitudinal axis;
- one or more (e.g. all) of the plates of the first pairs and/or one or more (e.g. all) of the plates of the second pairs are perpendicular to the longitudinal axis;
- one or more (e.g. all) of the first and/or second plates present a curved wall delimiting the open chambers, and/or one or more (e.g. all) of the first and/or second plates present a flat wall delimiting the closed chambers;
- the closed chambers comprise an elastic membrane;
- the diameter of one or more (e.g. all) plates is higher than 40 cm and/or lower than 100 cm;
- the marine vibrator further comprises a base connected to the actuator, the second elements being fixed to the base, the actuator being configured to move the first elements relative to the base;
- the actuator is connected to the first elements so as to reciprocate the first elements relative to the second elements, the first plates being thereby reciprocated relative to the second plates (since the first plates are secured to the first elements and the second plates are secured to the second elements);
- the actuator is connected to the first elements via a first plate located next to the base, a first portion of the actuator being fixed to said first plate located next to the base (said first portion being thereby fix relative to the first elements and the first plates), a second portion of the actuator being fixed to the base (said second portion being thereby fix relative to the second elements and the second plates), the actuator being configured to operate reciprocation of the first portion relative to the second portion and thereby to reciprocate said first plate located next to the base relative to the base (and thus to reciprocate all first elements relative to the base and to the second elements so as to reciprocate all first plates relative to the second plates);
- the second plates are connected to the first elements with at least one degree of freedom, and the first plates are connected to the second elements with at least one degree of freedom;
- the degree of freedom is a translation along the longitudinal axis;
- the first elements and/or the first plates comprise titanium, inox and/or rigid foam;
- the marine vibrator further comprises one or more ballasts;
- the marine vibrator further comprises one or more stabilizers;
- the stabilizers are fins;
- the marine vibrator further comprises a system for controlling the air pressure inside the closed chambers;
- the marine vibrator further comprises a sensor configured for detecting acoustic waves;
- one or more (e.g. all) first plates and one or more (e.g. all) second plates are shaped as a disk and/or as a parallelepiped;
- one or more (e.g. all) first elements and one or more (e.g. all) second elements are rods and/or bars;
- the actuator is a hydraulic or an electro/hydraulic actuator; and/or
- an association of a succession of a first plate and a second plate forming a peripherally closed chamber being an independent module;

It is further provided a computer program comprising instructions for controlling operation of the actuator of the marine vibrator.

It is further provided a computer readable storage medium having recorded thereon the computer program.

It is further provided a system comprising a surface vessel and the marine vibrator. The surface vessel is configured for towing the marine vibrator.

The surface vessel may be an autonomous surface vessel. The arrangement of the first plates and the second plates, supported respectively by peripheral and longitudinal first and second elements, give the seismic marine vibrator a geometry that facilitates the towing of the seismic marine vibrator by an unmanned vessel. Examples of the marine vibrator may present a relatively low weight for a relatively intense acoustic wave generated at a given frequency, even at a relatively low frequency, such that the marine vibrator requires relatively low towing power. The marine vibrator is thus well-suited in the context of surface autonomous vessels where economy of power is of importance.

In examples, the system may present any one or more of the following features:

- the system further comprises a cable for supplying energy from the surface (e.g. autonomous) vessel to the actuator;
- the system further comprises a submarine hydraulic power unit, the cable for supplying energy from the surface supplying energy to the power unit, the marine vibrator further comprising an electric engine and an oil reserve, the actuator being hydraulic (e.g. a hydraulic piston) and supplied by the power unit;
- the system further comprises a control unit including a communication unit for receiving at least one target frequency and for sending a command including a reciprocation frequency and a corresponding reciprocation distance to the actuator;
- the control unit further includes a processing unit coupled to the communication unit and configured for determining said reciprocation frequency and the corresponding reciprocation distance;
- the system further comprises a sensor configured for detecting acoustic waves, the sensor being coupled to the communication unit, the determination of the corresponding reciprocation frequency including executing a control loop based on a frequency of one or more detected acoustic waves;
- the sensor is mounted on the marine vibrator;
- the system further comprises comprises a memory having stored thereon a transfer function and/or a calibration table, the processing unit being coupled to the memory, the determination of the reciprocating frequency corresponding to a target frequency including converting the target frequency into the corresponding frequency based on the transfer function and/or the calibration table; and/or
- the memory has stored thereon a computer program comprising instructions executable by the processing unit for determining the reciprocation frequency and the corresponding reciprocation distance.

It is further provided a method of producing acoustic waves in an aquatic zone. The method comprises positioning one or more devices in the aquatic zone. The devices are positioned at a depth of interest. For example, the depth of interest may be a depth allowing the generation of seismic waves which can be reflected by the marine subsoil. The one or more devices include a plurality of first plates arranged along a longitudinal axis. The one or more devices also include longitudinal and peripheral first elements secured to the first plates. The one or more devices also include a plurality of second plates arranged along the longitudinal axis. The first plates alternate with the second plates. The one or more devices also include longitudinal and peripheral second elements secured to the second plates. The one or more devices also include peripherally closed air-filled chambers. The peripherally closed air-filled chambers are defined between respective first pairs of adjacent plates. The one or more devices also include peripherally open chambers. The peripherally open chambers are defined between respective second pairs of adjacent plates. The respective first pairs of plates alternate with the respective second pairs of plates. The method further comprises reciprocating the first plates relative to the second plates. The reciprocation is performed at a varied frequency. The frequency is varied according to a predetermined sweep. The sweep is performed so as to take in and expel water radially generating an acoustic wave.

The method may involve several devices. At least two devices may generate acoustic waves with different frequency signatures. The method thereby offers a very efficient way to perform seismic studies, with several seismic sources generating distinct signals and each towed by an autonomous surface vessel. The different generated waves may be collected simultaneously and their characteristics, including the initial wave frequency and/or the device that generated each wave, identified.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
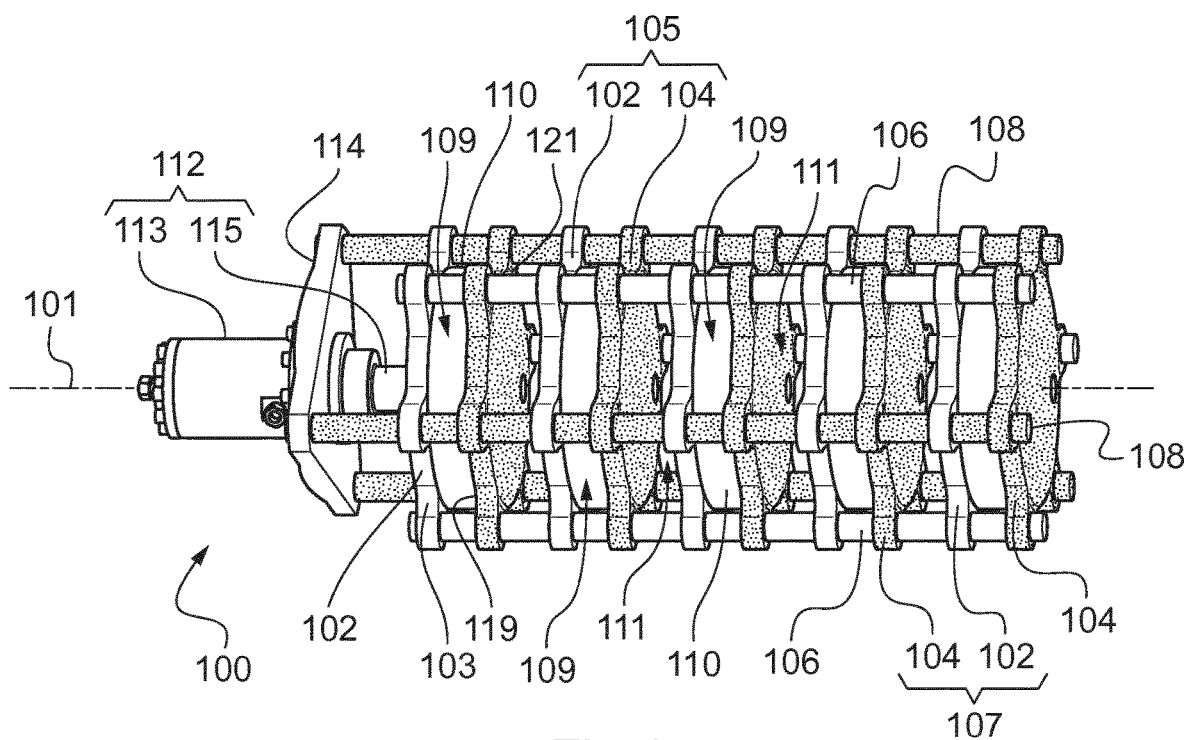
FIG. 1 shows an example of the marine vibrator.

FIG. 1 shows an example of a seismic marine vibrator 100. Marine vibrator 100 may be completely immersed in water so as to generate a seismic acoustic wave.

Marine vibrator 100 extends along longitudinal axis 101. Marine vibrator 100 comprises a plurality of first plates 102 arranged along longitudinal axis 101, alternating with a plurality of second plates 104 arranged along longitudinal axis 101. A first plate 102 alternates with a second plate 104 along the longitudinal axis 101. In other words, the next plate after a first plate 102 is a second plate 104 and the next plate after a second plate 104 is a first plate 102, and so on.

In the illustrated example, first plates 102 and second plates 104 are all generally perpendicular to longitudinal axis 101.

First plates 102 and second plates 104 present a disk shape of circular cross-section. In other and alternative examples, at least part of the first and second plates may present different shapes.

The first plates 102 can be reciprocated with respect to the second plates 104 along the longitudinal axis 101. The term "reciprocated" designates a relative back and forth movement.

The first plates 102 and second plates 104 are respectively secured to longitudinal and peripheral first 106 and second 108 elements. The first elements 106 are fastened to the first plates 102 at the periphery of the first plates 102 so as to hold the first plates 102 together. Similarly, the second elements 108 are fastened to the second plates 104 at the periphery of the second plates 102 so as to hold the second plates 102 together. Notably, the first elements 106 are mobile with respect to the second plates 104 and the second elements 108 are mobile with respect to the first plates 102. The first elements 106 and the second elements 108 are angularly distributed around the marine vibrator. In other words, the first elements 106 and the second elements 108 are radially spaced around longitudinal axis 101 of marine vibrator 100. The first elements 106 and the second elements 108 support the structure of the marine vibrator.

Marine vibrator 100 has three first elements 106 and three second elements 108. In non-illustrated examples, the marine vibrator may alternatively comprise a different number of first and/or second elements.

In the illustrated example, the first elements 106 and the second elements 108 are rigid rods (i.e. circular cross-section bars). In alternative and non-illustrated examples, the first elements and the second elements may be any elongated structures which can be used to support the plates, for example other rigid structures than rods, such as non-circular cross-section bars.

The first elements 106 and/or second elements 108 may be formed of material comprising or consisting of any one or any combination of titanium, inox, rigid foam and/or other rigid materials.

Marine vibrator 100 comprises an actuator 112 fixed on a base 114 and positioned along the longitudinal axis 101 behind the first plate 102.

In the illustrated example, base 114 forms a stage connected to actuator 112. In alternative and non-illustrated examples, the stage may be connected to another structure supporting the actuator.

The actuator 112 and the base 114 are both centered on the longitudinal axis 101, giving a symmetry of revolution to marine vibrator 100. The actuator 112 operates the reciprocation of first plates 102 relative to the second plates 104. For example, the piston of actuator 112 may exert a force on the first plate 102 located next to the base 114 and referenced 103 on the figure, operating the reciprocation of said first plate 103 with respect to second plate 104.

Actuator 112 comprises a single piston 115 inside a cylinder 113, but other types of actuators may also be used. Also, in other examples, several actuators may be used instead of a single one, the actuators being configured to operate the reciprocation between the first and second plates.

Notably, when the actuator 112 operates the reciprocation of said first plate 103 with respect to the second plate 104 located next to first plate 103 along longitudinal axis 101, the first elements 106 and the other first plates 102 secured to the first elements 106 are also reciprocated with respect to the second elements 108 and the second plates 104. The base 114 is fixed to the second elements 108 which secure the second plates. As such, the actuator is configured to reciprocate the first elements 106 relative to the stage-forming base 114.

Peripherally closed chambers 109 are defined between respective first pairs 105 of adjacent plates 102 and 104. Specifically, a peripherally closed chamber 109 is the closed space located between a first plate 102 and a second plate 104, the second plate being next to the first plate along the longitudinal axis 101 (starting from the first plate 103). The peripherally closed chambers 109 have a wall 110 on their periphery. The walls 110 close their respective peripherally closed chambers 109 making them airtight. The peripherally closed chambers 109 may be filled with a gas, such as air. The peripherally closed chambers may thus be air-filled during use of marine vibrator 100. Marine vibrator 100 has five peripherally closed chambers. Other examples may comprise more or fewer peripherally closed chambers.

Peripherally open chambers 111 are defined between respective second pairs 107 of adjacent plates alternating with the first pairs 105 of plates. Specifically, a peripherally open chamber 111 is the open space located between a second plate 104 and a first plate 102, the first plate 102 being next to the second plate 104 along the longitudinal axis 101 (starting from the first plate 103). The peripherally open chambers 111 have no wall on their periphery and thus no other obstruction than first elements 106 and second element 108, making the peripherally open chambers 111 in fluid communication with the marine environment surrounding vibrator 100. The peripherally open chambers 111 may thus be filled with water during use of marine vibrator 100. Notably, water may be introduced inside a respective open chamber 111 via a peripheral opening of the respective open chamber 111, the peripheral opening being defined between a peripheral edge 119 and a peripheral edge 121 respectively of the first plate 102 and of the second plate 104 which delimit the respective open chamber 111. Marine vibrator 100 has four peripherally open chambers 111. Other examples may comprise more or fewer peripherally open chambers.

The peripherally open chambers 111 alternate with the peripherally closed chambers 109 along the longitudinal axis 101 of marine vibrator 100.

The peripherally open chambers 111 are in fluid communication with the outside of the marine vibrator 100. In other words, the peripherally open chambers 111 are open to the marine environment surrounding the marine vibrator. Thus, the peripherally open chambers 111 may be completely filled with water during use. For example, water may enter the peripherally open chambers through the surface delimited by the corresponding peripheral edges 119 and 121 of the two adjacent plates defining the respective peripherally open chambers. When a first plate 102 is reciprocated with respect to a second plate 104, the volume of the peripherally open chambers 111 varies. This allows water to be taken into the peripherally open chamber 111 and then radially expelled, so as to generate an acoustic wave.

Notably the first elements 106 and the second elements 108 are at the periphery of the peripherally open chambers 111. Furthermore, the inside of peripherally open chambers 111 is unoccupied by any structure. Hence, all the volume of the peripherally open chambers 111 may be filled with water during use of marine vibrator 100. This allows the whole surface of the first plates 102 and the second plates 104 facing the peripherally open chambers 111 to be in contact with water. This in turn, allows more water to be displaced during a reciprocation increasing the efficiency when generating a wave.

Figure 2:
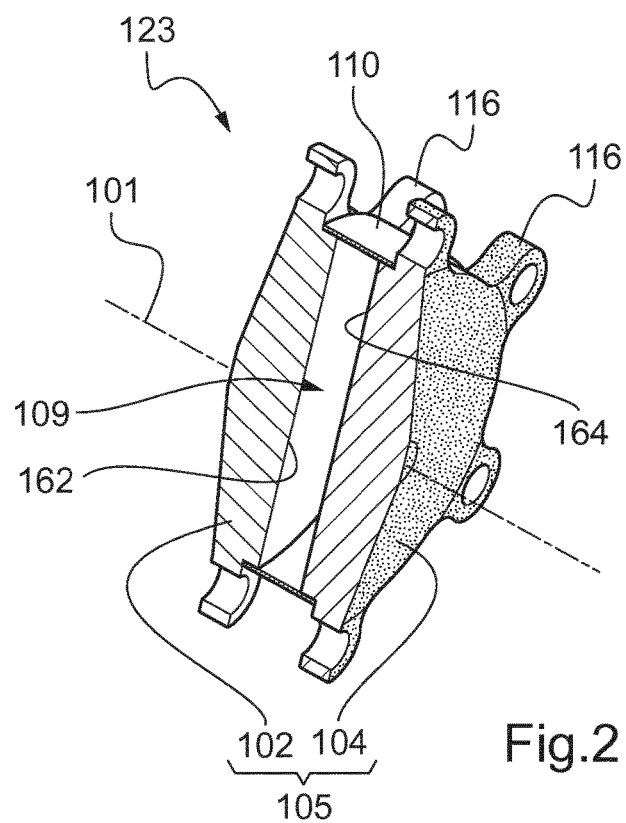
FIG. 2 shows a longitudinal section of an assembly of a first and second plates forming a closed chamber of the marine vibrator of FIG. 1.

FIG. 2 shows an example of a longitudinal section of a module 123 comprising a first pair 105 of plates 102 and 104 defining a peripherally closed chamber 109. The peripherally closed chamber 109 is closed by wall 110 on its periphery. In the illustrated example, plate 102 comprises flat (i.e. substantially planar) wall 162 delimiting on one side peripherally closed chamber 109, and second plate 104 comprises flat (i.e. substantially planar) wall 164 delimiting on one side peripherally closed chamber 109.

Wall 110 may be elastic, for example an elastic membrane. In such examples, when a first plate 102 is reciprocated with respect to a second plate 104, the elastic membrane between the first plate 102 and the second plate 104 may be deformed while maintaining the respective closed chamber 109 airtight. In other words, the elastic membrane keeps the peripherally closed chambers 109 hermetic. The elastic membrane may comprise plastic materials resistant to sea-water. In examples, the plastic materials have an elongation of 120%. This reduces the risk of the peripherally closed chambers 109 breaking and losing its hermeticity.

First plates 102 and second plates 104 each have several ring-like protrusions 116 at their periphery which protuberate radially and externally relative to longitudinal axis 101. Ring-like protrusions 116 are external to the peripherally open chamber 111. The ring-like protrusions 116 of the first plates 102 and in the second plates 104 are adapted for connection of the first plates 102 and in the second plates 104 with first elements 106 and second elements 108. In specific and referring also back to FIG. 1, the rod shapes of first elements 106 and second elements 108 are inserted in ring-like protrusions 116.

The connection restricts the degrees of freedom of the first elements 106 with respect to the second plates 104 and the degrees of freedom of the second elements 108 with respect to the first plates 102. The connection is made between a first element 106 and a second plate 104, so that the first element 106 is allowed to slide through the ring-like protrusions 116 of the second plate 104 parallel to the longitudinal axis 101. In other words, a back and forth movement of the first elements 116 relative to the second plates 104 is allowed while no angular movements are possible. This allows the first element 106 to be reciprocated relative to the second plate 104 along the longitudinal axis 101 of marine vibrator 100. Similarly, the connection is made between a second element 108 and first plates 102, so that the second element 108 is allowed to slide through the ring-like protrusions of the first plates 102 parallel to the longitudinal axis 101.

The connection secures the first elements 106 with respect to the first plates 102 and the second elements 108 with respect to the second plates 104. The connection is made between a first element 106 and a first plate 102, so that the first element 106 is fixed and not allowed to slide through the ring-like protrusions 116 of the first plate 102. Similarly, the connection is made between a second element 108 and a second plate 104, so that the second element 108 is fixed and not allowed to slide through the ring-like protrusions of the second plate 104. In examples the connection between a second plate 104 and a second element 108 and/or between a first plate 102 and a first element 106 may be rigid and secured through welding. Alternatively or additionally, one or more second elements 108 and/or one or more of the first elements 106 may each be comprised of two or more pieces fastened together through the use of male collars. This provides flexibility for the length of such first and/or second element(s).

Figure 3:
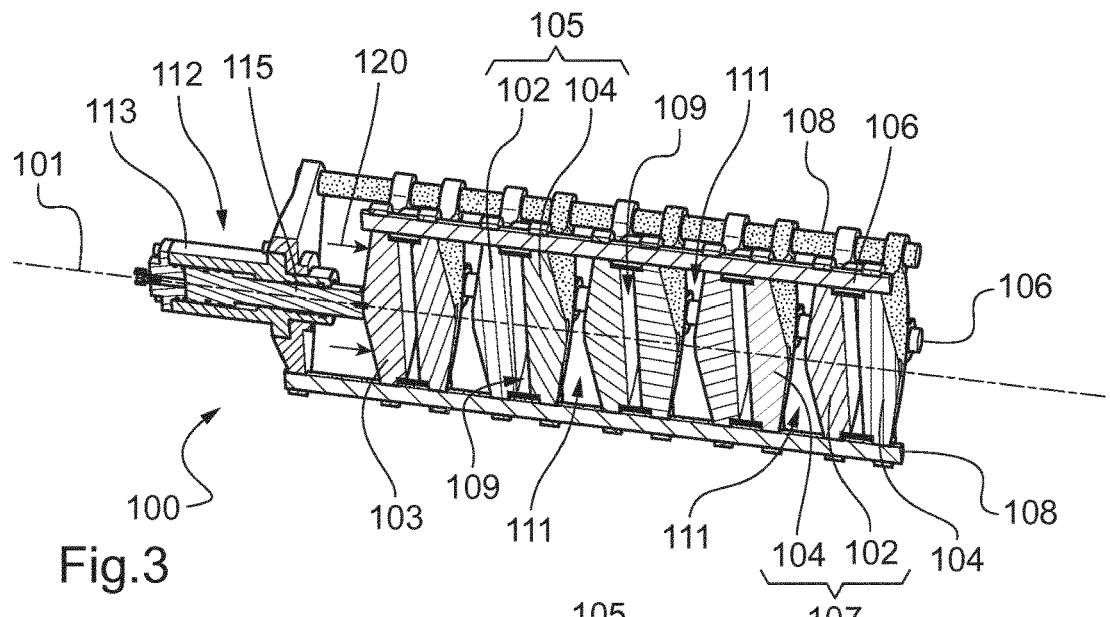
FIG. 3 shows a longitudinal section of the marine vibrator of FIG. 1 when taking in water.

FIG. 3 shows an example of a longitudinal section of marine vibrator 100 where the first plates 102 move relative to the second plates 104 to take in water in the peripherally open chambers 111 during a reciprocation.

The piston 115 of actuator 112 pushes first plate 103 in the direction of the arrows 120. First plate 103 slides along the second elements 108 when moving in said direction. Thus, the distance between first plate 103 and the second plate 104 next to first plate 103 gets shortened. It follows that the volume of the closed chamber 109, defined between first plate 103 and the second plate 104 next to first plate 103, is reduced. First elements 106 secure the first plate 103 with the other first plates 102 of marine vibrator 100. Therefore, first elements 106 and the other first plates 102 secured to the first elements 106, follow the movement of first plate 103. Thus, the movement of first plate 103 in the direction of the arrows 120 reduces the volume of all the peripherally closed chambers 109.

The reduction of volume of the peripherally closed chambers 109 results in an increase of the volume of the peripherally open chambers 111. The volume of a peripherally open chamber 111 defined between a second pair 107 of adjacent plates 104 and 102 is increased proportionally to the reduction of volume of the peripherally closed chamber defined between a first pair 105 of adjacent plates 102 and 104, the first plate 102 belonging to both the first pair 105 and the second pair 107 of adjacent plates.

The peripherally open chambers 111 comprise a surface delimited by the peripheral edge 121 of a second plate 104 and the peripheral edge 119 of a first plate 102, the first plate 102 and the second plate 104 belonging to a second pair of adjacent plates 107 defining a peripherally open chamber 111. The whole surface forms a peripheral opening. The peripheral opening increases when the volume of a respective peripherally open chamber 111 increases. Furthermore, the peripheral opening on the peripherally open chambers 111 presents a symmetry of revolution with respect to the longitudinal axis 101. This may allow large quantities of water to enter the peripherally open chambers 111 when the volume of the peripheral open chamber 111 increases.

Figure 4:
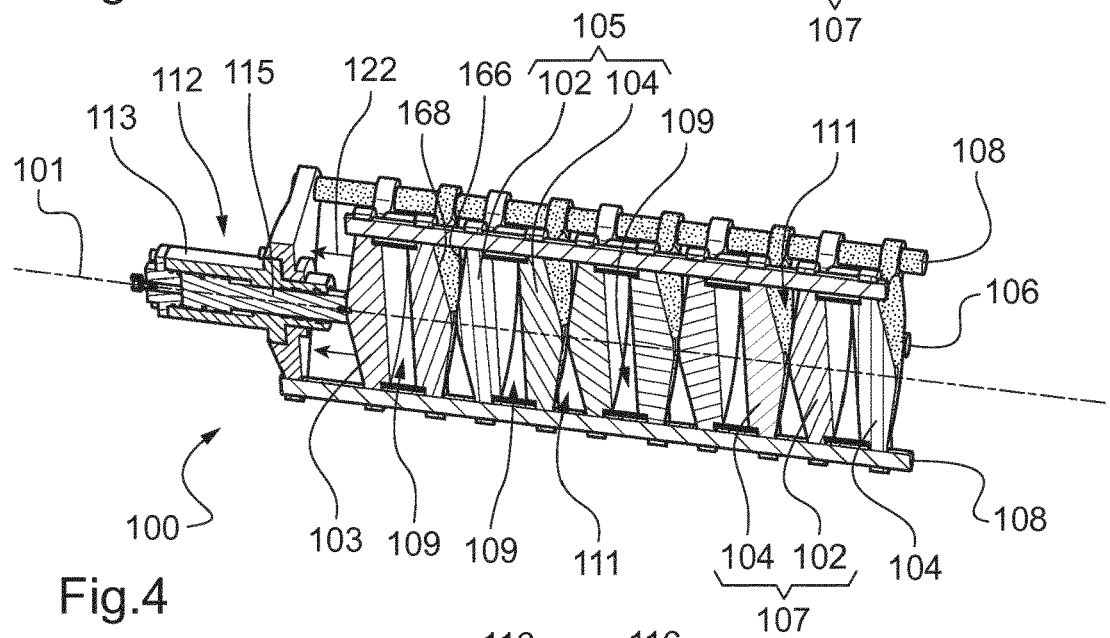
FIG. 4 shows a longitudinal section of the marine vibrator of FIG. 1 when expelling water.

FIG. 4 shows an example of a longitudinal section of marine vibrator 100 where water is expelled following and preceding the intake of water into the peripherally open chambers 111 represented in FIG. 3.

Following and preceding the intake of water, actuator 112 moves first plate 103 in the direction of arrows 122. This increases the volume of the peripherally closed chambers 109 while the volume of the peripherally open chambers 111 decreases. The water inside peripherally open chambers 111 is expelled through the respective peripheral openings of peripherally open chambers 111, generating a radial acoustic wave. The movement of the first plates 102 relative to the second plates 104 is cyclic. Thus, after water is expelled the marine vibrator will move the first plates 102 as illustrated in FIG. 3.

Thus, the generation of an acoustic wave involves a first movement of a first plate 102 pulling away from a second plate 104 with which the first plate 102 defines an open chamber 111. This allows the peripherally open chambers 111 to be filled with water. Then, a second movement of the first plate 102 brings the first plate 102 closer to the second plate 104, the first plate 102 and the second plate 104 defining a peripherally open chamber 111. This allows the water inside the peripheral open chamber 111 to be expelled.

Only the surface of the first plates 102 and second plates 104 facing a peripherally open chamber 111 are in contact with water inside the peripherally open chambers 111. Thus, the expelled water is not obstructed by obstacles inside the peripherally open chambers 111. This allows the full force transmitted to the water by the reciprocated first plates 102 to be converted into a radial wave. This increases the energy of the acoustic wave generated by the marine vibrator. The only obstacle on the path of the radially expelled water is the surface covered by first elements 106 and second elements 108 on the periphery of first plates 102 and second plates 104. However, the surface of the first elements 106 and the second elements 108 on the path of the radially expelled water is small in comparison to the surface of the peripheral opening the water was expelled through. With no sharp edges and only a small surface obstructing the expelled water, cavitation effects are minimized during the generation of acoustic waves by the marine vibrator.

The first plates 102 comprise a wall 166 delimiting the peripherally open chambers 111 and the second plates comprise a wall 168 delimiting the peripherally open chambers 111. The walls 166 and 168 are curved so as to increase the surface contact with water inside the peripherally open chambers 111. This increases the contact surface between the first 102 and second 104 plates and the water to be displaced, so as to improve the efficiency of the displacement of water. Furthermore, unlike a flat surface which transmits a horizontal movement to the water, a curved surface transmits a radial movement which more efficiently displaces the water radially.

Actuator 112 is configured to operate the reciprocation of the first plates 102 relative to the second plates 104 at different frequencies. For example, actuator 112 may transmit a periodic movement to the first plates 102 relative to the second plates 104, also reciprocating the first elements 106 relative to the second elements 108. Actuator 112 operates the reciprocation at different frequencies in a frequency band, generating acoustic waves of different frequencies. Actuator 112 may sweep some or all frequencies in the frequency band. The frequency sweep is predetermined.

Also, actuator 112 may be configured to reciprocate the first plates 102 relative to the second plates 104 over a distance which varies inversely of the frequency of the acoustic waves generated (i.e. the reciprocation distance increases—respectively decreases—as the frequency decreases—respectively increases). The lower the frequency, the longer the reciprocation distance. Optionally, the reciprocation distance may vary inversely of the squared frequency of the acoustic wave generated, for some frequencies. This corresponds to an optimal reciprocation distance. In examples, the reciprocation distance may vary between a minimum reciprocation distance of about ±1 mm and a maximum reciprocation distance of about ±50 mm, or up to about ±100 mm. The intensity of a wave generated by the displacement of water is proportional to the water volume displaced.

Actuator 112 may be configured to reciprocate the first plates 102 relative to the second plates 104 such that the generated acoustic wave presents a low frequency, for example equal or below 5 Hz. At similar intensity levels, generating a low frequency wave requires more water to be displaced than when generating a higher frequency wave. The marine vibrator 100 may be easily adapted for that.

Actuator 112 is operable to adjust the distance between first plates 102 and second plates 104 when generating an acoustic wave. In other words, actuator 112 is configured to generate one acoustic wave of any frequency comprised in a frequency interval with different intensities. For example, the frequency interval may comprise at least one low frequency, for example equal or below 5 Hz (e.g. 4 Hz or 3 Hz). The frequency interval may be bounded by this low frequency as a lower bound, and by an upper bound superior to 50 Hz or 100 Hz, for example equal to 150 Hz.

The actuator 112 may be an electro-hydraulic actuator or a hydraulic actuator, such as a servo-valve. Hydraulic actuators can exert a stronger force than electrical actuators. Thus, a hydraulic actuator may more easily actuate the displacement of large quantities of water.

Notably, the periodic movement transmitted to the first plates 102 may be facilitated by the air inside the peripherally closed chambers 109. When the first plates 102 are moved to fill the peripherally open chambers 111 with water, the volume of the peripherally closed chambers diminishes 109. Thus, the air pressure inside the peripherally closed chambers 109 briefly increases, which helps slow down the first plates movement near the end of a first reciprocation. As such, the air pressure inside the peripherally closed chambers 109 assists the actuator in crossing a power spike resulting from a change in direction during reciprocation of the first plates 102 relative to the second plates 104.

As mentioned above, the walls 110 surrounding the peripherally closed chambers 109 may be elastic membranes. The elastic properties of an elastic membrane facilitate a periodic reciprocation of the first plates 102 relative to the second plates 104, as there is no friction between stiff mechanical pieces.

Figure 5:
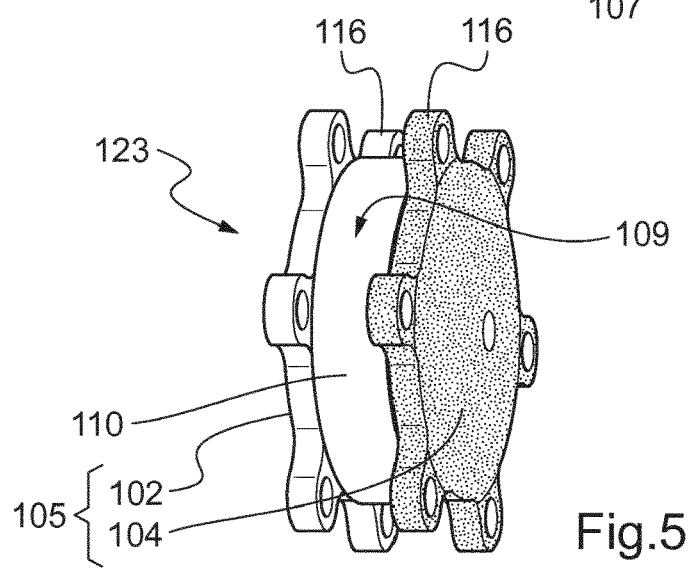
FIG. 5 shows an example of a module of the marine vibrator of FIG. 1.

FIG. 5 shows and example of a module 123 of marine vibrator 100. Peripherally closed chamber 109 are part of such independent modules of marine vibrator 100. Module 123 comprises a first pair 105 of plates 102 and 104 defining a peripherally closed chamber 109, and a wall 110 closing the peripherally closed chamber 109. The module may be added to marine vibrator 100 by sliding the first elements 106 and the second elements 108, through the ring-like peripheral protrusions 116. Then, securing first plate 102 of the module 123 to the first elements 106 and securing the second plate 104 of the module 123 to the second elements 108. Alternatively, a module 123 may be removed from the marine vibrator.

Such modularity enables rapid repairs when using the marine vibrator 100. For example, during a seismic prospection campaign if one of the modules 123 of the marine vibrator is damaged, the damaged module may be swapped from marine vibrator 100 with a spare functional module 123 and the measurements may continue. Thus, the campaign may quickly resume without having to go back for immediate repairs.

In addition, modules 123 may be added or removed to the marine vibrator depending on the situation. For example, if low frequency acoustic waves need to be generated, more modules may be added to marine vibrator 100 in order to more easily displace large quantities of water. If higher frequency acoustic waves are to be generated, removing modules from the marine vibrator allow to make it lighter, thus more easily towed by vessels.

The use of independent modules 123 simplifies the manufacture of the marine vibrator. As mentioned above, the wall 110 of a module 123 may in examples be an elastic membrane. In said examples, fixing an elastic membrane to a first plate 102 and to second plate 104 may be performed using an overmolding technique while manufacturing the two plates of a module 123. This is a simple method which ensures that module 123 is airtight and will remain so during the generation of acoustic waves. Alternatively pinching the cuff between two flanges of a plate in the form of a chicane may also be performed to fix the elastic membrane to a first plate 102 and a second plate 104. This manufacturing option allows the fixed membrane to be disassembled from the plates.

Notably, the alignment of the modules 123 relies on the first elements 106 and the second elements 108, further facilitating the manufacture of the marine vibrator. In the illustrated example, first elements 106 and second elements 108 in the shape of rods can go through ring-like protrusions 116 of the first 102 and second 104 plates of the modules 123, aligning the first plates 102 and the second plates 104.

The marine vibrator may be towed by a vessel. Thus, modules 123 forming the marine vibrator may be sturdy. The first plates 102 and/or the second plates 104 may be formed of material comprising or consisting of any one or any combination of titanium, inox, rigid foam and/or other rigid materials. Using materials such as rigid foam reduces the inertia when reciprocating the first plates 102, reducing the energy needed for the reciprocation.

In examples, using rigid foam enveloped by a layer of titanium or inox to manufacture the first elements and the first plates may reduce the weight of the marine vibrator. This facilitates towing the marine vibrator in a marine environment, as well as manipulating the marine vibrator in between uses.

In non-limiting examples, the diameter of the plates of the module 123 may be between 40 cm and 100 cm.

Figure 6:
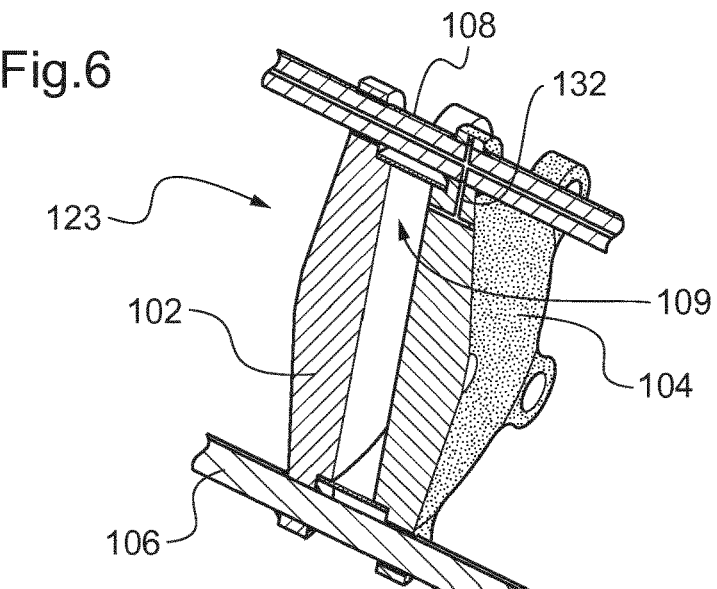
FIG. 6 shows an example of a longitudinal section of a module and a first and second peripheral elements, comprising air conducts, of the marine vibrator of FIG. 1.

FIG. 6 shows a longitudinal section of module 123 of marine vibrator 100 along with a first element 106 and a second element 108. This figure illustrates the fact that modules 123 have small conducts which allow air to communicate between multiple peripherally closed chambers 109.

Air conducts 132 inside the second plate 104 and inside the second element 108 allow air to flow through the peripherally closed chamber 109 into the second element 108. This allows the air conducts 132 to communicate with other peripherally closed chambers 109 also comprising small air conducts. The air conducts 132 allow the pressure inside all the connected peripherally closed chambers 109 to be substantially equal between all peripherally closed chambers 109. The air conducts 132 have stoppers at the ends in contact with the marine environment to keep water from entering the air conducts 132.

The second element 108 and second plates 104 are secured together. Thus, the second elements 108 and the second plates 104 are immobile in respect with one another. Thus, the system forming the air conducts 132, which goes through the second plates 102 and through the second elements 108, is static as none of its components move with respect to each other. Therefore, the system maintaining the air conducts 132 airtight is a static system. This reduces the risk of the air conducts 132 from being flooded during the use of the marine vibrator. The manufacture of the air conducts 132 is simple. A static airtight system is easier to manufacture than a system where components are mobile at their junctures. In examples, the manufacture of the air conducts 132 comprises using drilling methods as known in the art. Then stoppers may be added to seal the air conducts 132 from the exterior.

The marine vibrator may be submerged at different depths underwater. For example, marine vibrator 100 may be submerged at various depths of interest during seismic prospection operations. The marine vibrator may have one or more depth control mechanism, for example ballasts or stabilizers.

Figure 7:
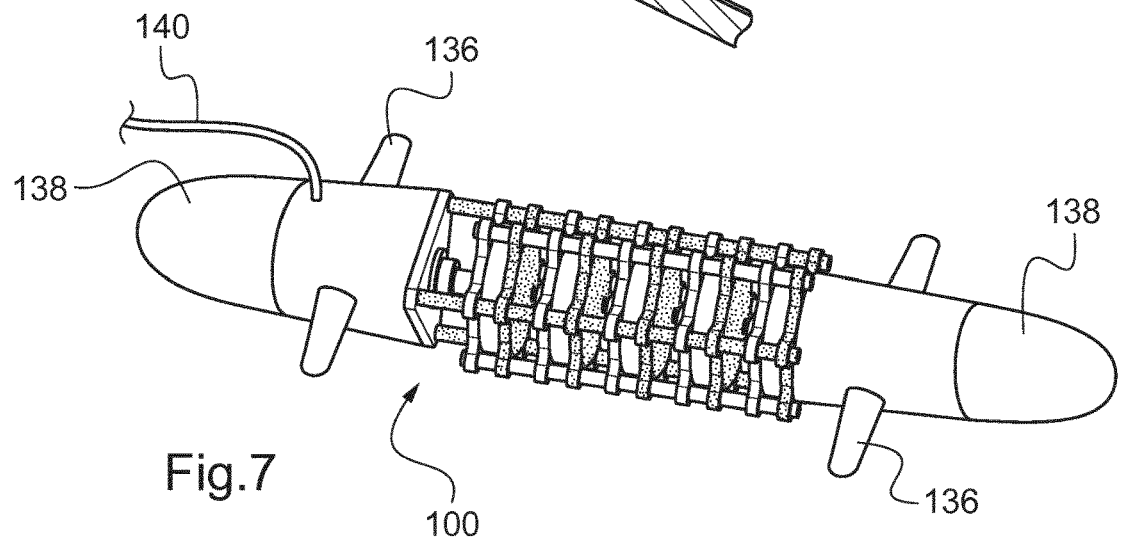
FIG. 7 shows the marine vibrator of FIG. 1 with ballasts, stabilizers and a cable attached to it.

FIG. 7 shows an example of marine vibrator 100 with stabilizers 136 and ballasts 138 fixed at the ends of the marine vibrator. The ballasts 138 are reserve devices configured for modifying and controlling immersion or balance of marine vibrator 100. The ballasts 138 may change their buoyancy in order to sink, raise or maintain at a constant depth marine vibrator 100. In other words, the ballasts 138 change the value of the upwards force exerted on the marine vibrator as a whole. A positive buoyancy may raise marine vibrator 100 to the surface. A negative buoyancy may make marine vibrator 100 sink, a substantially zero buoyancy may maintain marine vibrator 100 at a constant depth. The ballasts 138 may also keep marine vibrator 100 in a horizontal equilibrium.

A cable 140 is attached to marine vibrator 100 and to a separate surface vessel, such as a surface autonomous vessel. The cable 140 may provide energy to the marine vibrator from the vessel. Alternatively or additionally, the cable 140 may also enable the transmission of data between the marine vibrator and the vessel. In examples, the cable 140 may provide electric power to actuator 112 or to a submarine hydraulic power unit, the marine vibrator further comprising an electric engine and an oil reserve, the actuator being a hydraulic piston and supplied by the power unit. The vessel attached to cable 140 tows marine vibrator 100 using cable 140.

In examples, marine vibrator 100 may be used for marine prospection operations. During marine prospection operations, seismic sources such as marine vibrator 100 may be towed at a speed up to 5 or 7 knots in a measurement zone. The forces applied to marine vibrator 100 when being towed may change the depth at which marine vibrator 100 is at. Stabilizers 136 may be used to compensate for these towing forces, keeping the marine vibrator at a constant depth when towed. The length of the cable 140 may also be adjusted to change the depth at which marine vibrator 100 is at.

Cable 140 may also provide the marine vibrator with liquids or gas. For example, through cable 140 the ballasts 138 may receive air or water or oil from a hydraulic unit. Air may also be provided to the peripherally closed chambers 109 using cable 140.

Figure 8:
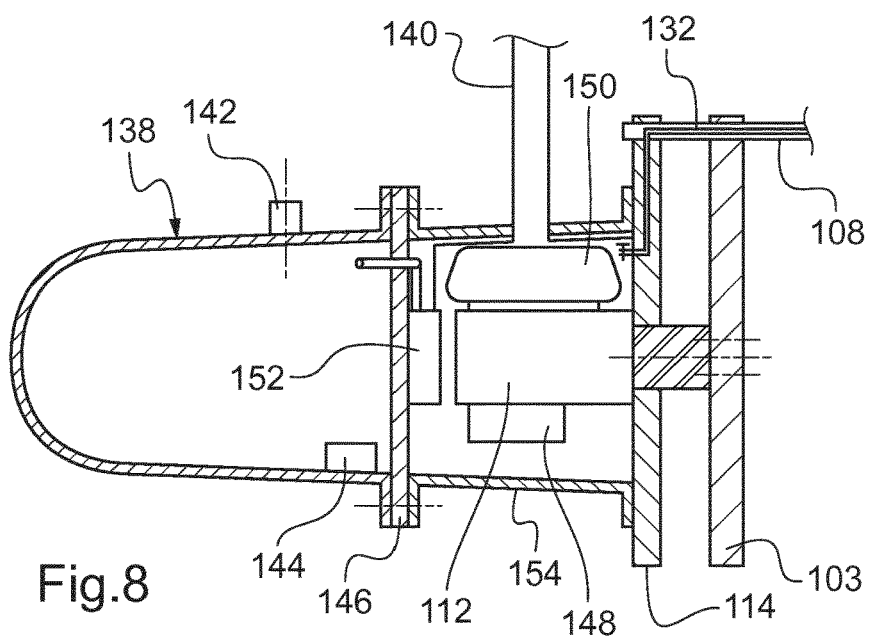
FIG. 8 shows a schematic representation of a longitudinal section of an extremity portion of FIG. 7.

FIG. 8 shows an example of the connection of a ballast 138 with the marine vibrator. The ballast 138 has an air purge valve 142 and a water purge valve 144. A hatch 146 comprising an electro-pneumatic interface module 152 separates the ballast 138 from the actuator 112. The actuator comprises a servo-valve 148 and a hydraulic reservoir 150. The actuator is connected to first plate 103. An electric/hydraulic housing 154 protects the ballast and the actuator making them airtight. Other examples may also comprise a pump and/or an electric engine and/or have one or more of the previous components.

Inside the second element 108, the air conducts 132 go through the base 114 into the space connected to the cable 140. At the extremity of the air conducts there may be a valve. This allows a connection to be made using cable 140 with the air conducts 132. In non-illustrated examples, a tube may go through cable 140 and communicates with the air conducts 132 of marine vibrator 100. This allows the air pressure inside the peripherally closed chambers 109 to be controlled using an air compressor on the vessel connected to cable 140. Alternatively, the compressor may be included in marine vibrator 100.

Notably, by controlling the air pressure inside the peripherally closed chambers 109, it is possible to substantially equate the air pressure inside a peripherally closed chamber with the water pressure exerted on the marine vibrator at different depths. Having a pressure inside the peripherally closed chambers substantially equal to the pressure exerted by the marine environment makes the force needed to move the first plates 102 to be substantially equal at different depths and in different directions. Thus, the reciprocation of the first plates 102 relative to the second plates 104 is more efficient as the force required for the plate movements during the reciprocation does not depend on the direction nor on the depth, increasing efficiency.

A control unit controls the frequency of the waves generated by the marine vibrator. For example, the control unit may send commands to actuator 112 in marine vibrator 100 triggering a piston stroke to generate a wave of a predetermined frequency. The piston stroke reciprocates the first plates 102 with respect to the second plates 104, thus generating an acoustic wave.

Figure 9:
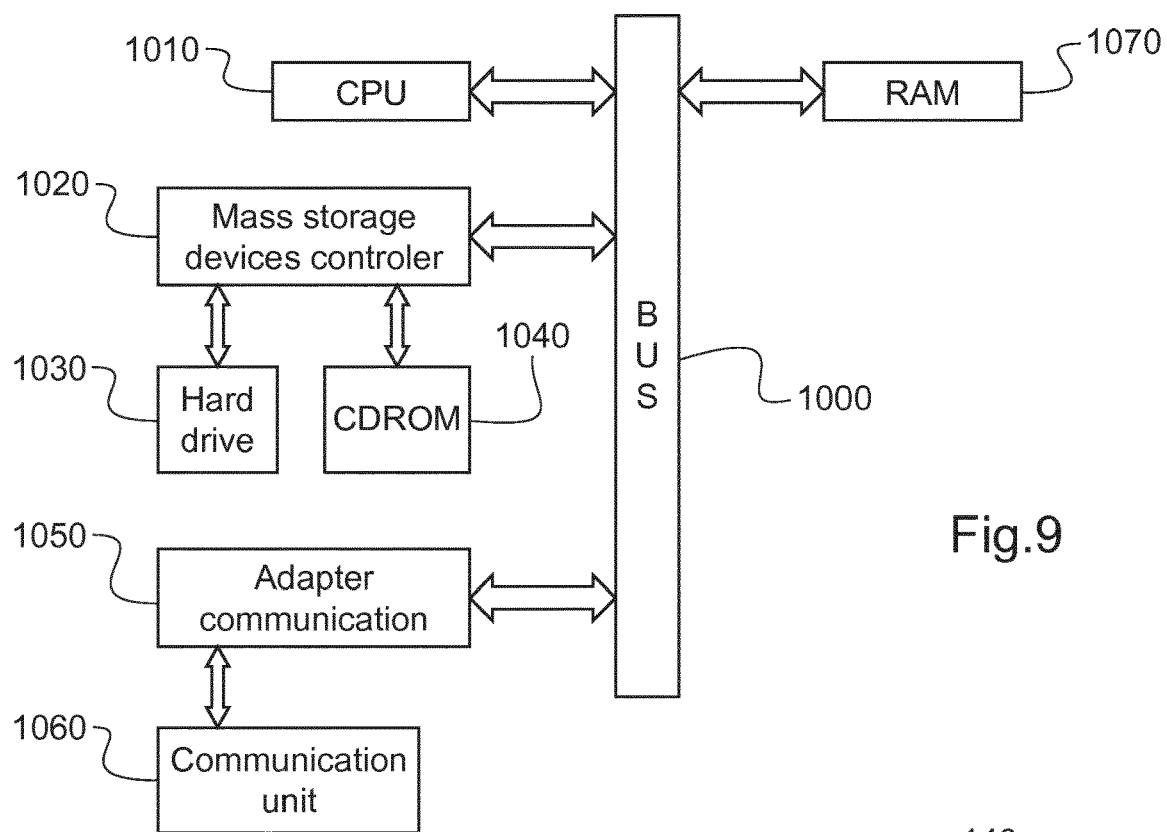
FIG. 9 shows a schematic representation of an example control unit.

Referring to FIG. 9, the control unit includes a communication unit 1060 for receiving at least one target frequency. The target frequency is a predetermined frequency, for example provided by a user. The communication unit may also send a command to an actuator 112. The command may include a reciprocation frequency and a corresponding reciprocating displacement for the first plates 102.

The control unit further includes a processing unit (e.g. CPU connected to a BUS 1000) 1010 coupled to the communication unit 1060. The processing unit 1010 is configured to determine the reciprocation frequency and the corresponding reciprocation distance which generates an acoustic wave of the target frequency. The processing unit may take into account other factors including but not limited to the number of modules 123 currently in the marine vibrator, the conditions of the marine environment and the desired intensity of the generated wave.

For example, a user may want to generate a 10 Hz acoustic wave using marine vibrator 100. The user inputs 10 Hz target frequency on the control unit and the processing unit 1010 determines from the input frequency what is the reciprocation frequency which generates a 10 Hz wave. The communication unit 1060 then sends a corresponding command to actuator 112 which triggers the generation of the acoustic wave. Alternatively, the user may use a predefined program to input one or more target frequencies. The communication unit 1060 may go through an adapter 1050.

The marine vibrator 100 may also comprise one or more sensors/receivers. For example, suitably hydrophone/geophone/accelerometers, for example accelerometers. The sensors/receivers are configured to be responsive to the waves generated by the marine vibrator. The sensor/receivers may be coupled to the communication unit 1060, so as to help determine the reciprocation frequency corresponding to a target frequency of a wave generated by the marine vibrator. The target frequency may be one of many comprised in a frequency sweep. In other words, a control loop stored on memory 1030 may be executed based on the frequency of one or more detected acoustic waves. Alternatively or additionally, the control loop may be executed to adjust the energy of a generated wave by changing the reciprocating distance of the first plates 102 relative to the second plates 104.

For example, the marine vibrator 100 generates a wave which has a target frequency of 10 Hz. A sensor collects a part of the wave generated by marine vibrator 100. The control unit determines that the collected wave has a frequency of 12 Hz, this may be due to the conditions of the marine environment. Thus, a new command is sent to actuator 112 in order to change the reciprocation frequency to generate a wave with a frequency of 10 Hz. The reciprocation distance may also be adjusted to match a desired energy for a generated wave.

The memory 1030 (e.g. a hard drive coupled to a mass storage device controler 1020 and/or RAM 1070) may additionally or alternatively have stored thereon a transfer function and/or a calibration table. Alternatively, the transfer function and/or calibration table may be accessed using a reading device 1040 (e.g. CDROM). The transfer function and/or calibration table may help determine the reciprocation frequency which generates a wave of a target frequency. In other words, the transfer function and/or calibration table may help determine the displacement conditions of the plates needed to generate a wave of a target frequency. The calibration table and/or transfer function may take into account different conditions, including but not limited to the number of modules of the marine vibrator and the marine environment. The processing unit is coupled to the memory (1030), so that it can determine the reciprocating frequency corresponding to a target frequency by converting the target frequency into a corresponding frequency based using the transfer function and/or the calibration table.

The control unit may be located in the marine vibrator or on a separate vessel. For example, in the surface autonomous vessel connected to marine vibrator 100 through cable 140. The control unit may be coupled to a computer system in the surface autonomous vessel or in another vessel. The surface autonomous vessel, the control unit and the marine vibrator may form a single seismic source system.

Figure 10:
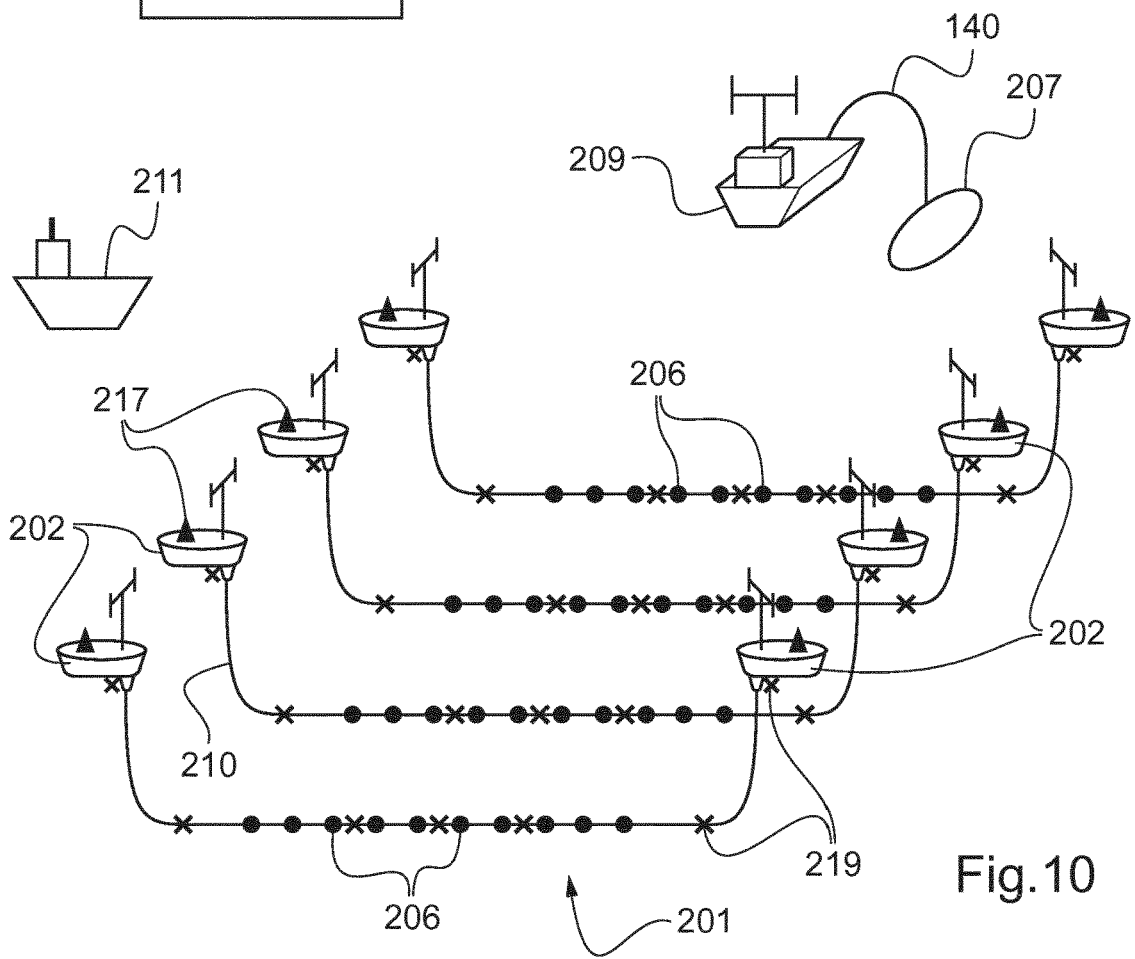
FIG. 10 shows a perspective view of a seismic acquisition system.

FIG. 10 shows a perspective view of an example of a marine seismic acquisition system integrating the seismic source system. The acquisition system comprises a set or fleet 201 of parallel seismic cables 210, thereby forming an array of midwater cables to acquire seismic signals (receivers), such as the one described in EP2017069081. The acquisition system also comprises one or more marine vibrators 207, such as marine vibrator 100. A marine vibrator 207 is towed by a source vessel 209, such as a surface autonomous vessel, using a cable 140. In other examples, several marine vibrators may be positioned as explained above.

In the illustrated example, each cable 210 is connected at its ends to independent RAVs 202 (surface autonomous recording vessels) adapted for exerting respective forces on cable 210 in opposite directions, the cable being thereby able to be maintained in a stationary or pseudo-stationary position when the forces exerted by the RAVs at the ends of the cable along its axis are of equal or substantially equal magnitude. To achieve the displacement of the cable from an acquisition zone to another, the forces exerted by the RAVs may be adjusted in such a way that the drone connected to the head of the cable tows it and the one at the tail of the cable exerts a much weaker force than the head drone, just enough to maintain a tension in the cable. The RAVs 202 thereby position receiving cables and control the array geometry. The set 201 of cables 210 is provided with a plurality of sensors/receivers 206 (suitably hydrophone/geophone combinations) capable of collecting said reflected waves. Such a cable 210 may be called a "seismic cable". The cables 210 evolve in an acquisition station adapted to prospect part of the aforementioned area of the subsoil. The marine vibrator 207 is triggered, in other words one or more waves are generated by displacing water using marine vibrator 100 as previously described. Alternatively, two or more seismic sources may be triggered. The frequency of the generated waves may be the same for each source. Alternatively, the frequency of the waves generated by each source at a given time may be different. The two or more seismic sources have different source signatures. The source signature may be a sequence of signals emitted by the source. The emitted signals may comprise different frequencies, phases, lengths, a particular order or repetitions in the signal. Thus, the waves that each source generates can be distinguished.

The receivers 206 are used to pick up the reflected waves. It is then possible to operate the RAVs 202 to move the cables 210 to another measuring station adapted to prospect another part of the aforementioned area, and to move the marine vibrator 207 as well, and so forth. The cables 210 have a neutral buoyancy and are submerged at a depth (i.e., the distance relative to the surface of the water, which surface is not represented on the figure). Each of the cables 210 is suitably provided with ballast-forming elements 219 designed to keep the cable 210 at the desired weight in the water so as to be neutrally buoyant. The ballasts 219 allow the cables 210 to be kept at substantially constant depth and to vary it in a controlled manner. Each of the cables 210 is also provided at both ends thereof with surface RAVs 202 in the example, capable of moving the cables 210 and keeping each cable 210 under tension. The master vessel 211 coordinates overall operations and communicates with the RAVS 202 and the one or more source vessels via antenna 217 provided on an RAV 202. Alternatively, the master vessel may communicate with the one or more source vessels using a cable.

The positioning of the cables, the one or more source vessels, and/or the control of the ballasts and/or the one or more marine vibrators may be performed automatically or semi-automatically (e.g. involving to some extent human specialists on-land or on-board e.g. the vehicle towing the source or any nearby vessel via computer program(s) embedded in one or more control units that may receive signals from and/or send signals to any element of the system to which such control unit is coupled (e.g. via radio link for surface communications and physical—e.g. electrical—cable connection for underwater communications). Such control unit(s) may be embedded within any vehicle (e.g. the source vessel or any nearby vehicle) and/or the RAVs, and/or any other element of any cable for which control is needed.

The following discusses modelling of marine vibrators.

According to "*The acoustic output of a marine vibrator*" by Leon Walker et al., SEG Technical Program Expanded Abstracts 1996: pp. 17-20, the theoretical modelling of a marine vibrator shows that the output is proportional to the second derivative of the injected volume of water as follows in equation 1:

$$p - p0 = \frac{\rho * \ddot{V}}{4\pi r}$$

Where:
p is the absolute emitted pressure;
p0 is the hydrostatic pressure;
ρ is the water density;
r is the distance at which the emitted pressure field is measured;
V is the vibrator volume.

Assuming a sinusoidal volume variation for the volume of the vibrator V can be written as equation 2:

$$V = V\min + \frac{Vin}{2} * (1 + \sin(2\pi ft))$$

Where:
Vin is the injected water volume;
Vmin is the residual minimal volume;
f is the frequency of the sinusoidal variation.

By combining equations 1 and 2 a pure frequency can be obtained in emission:

$$p - p0 = -\frac{\pi \rho \psi}{2r} * \sin(2\pi ft)$$

with p in pascals.

In the above equation, $\psi = Vin * f^2$ is a fundamental parameter that directly relates to the maximal sound pressure level and is proportional to the intensity of the generated wave.

Figure 11:
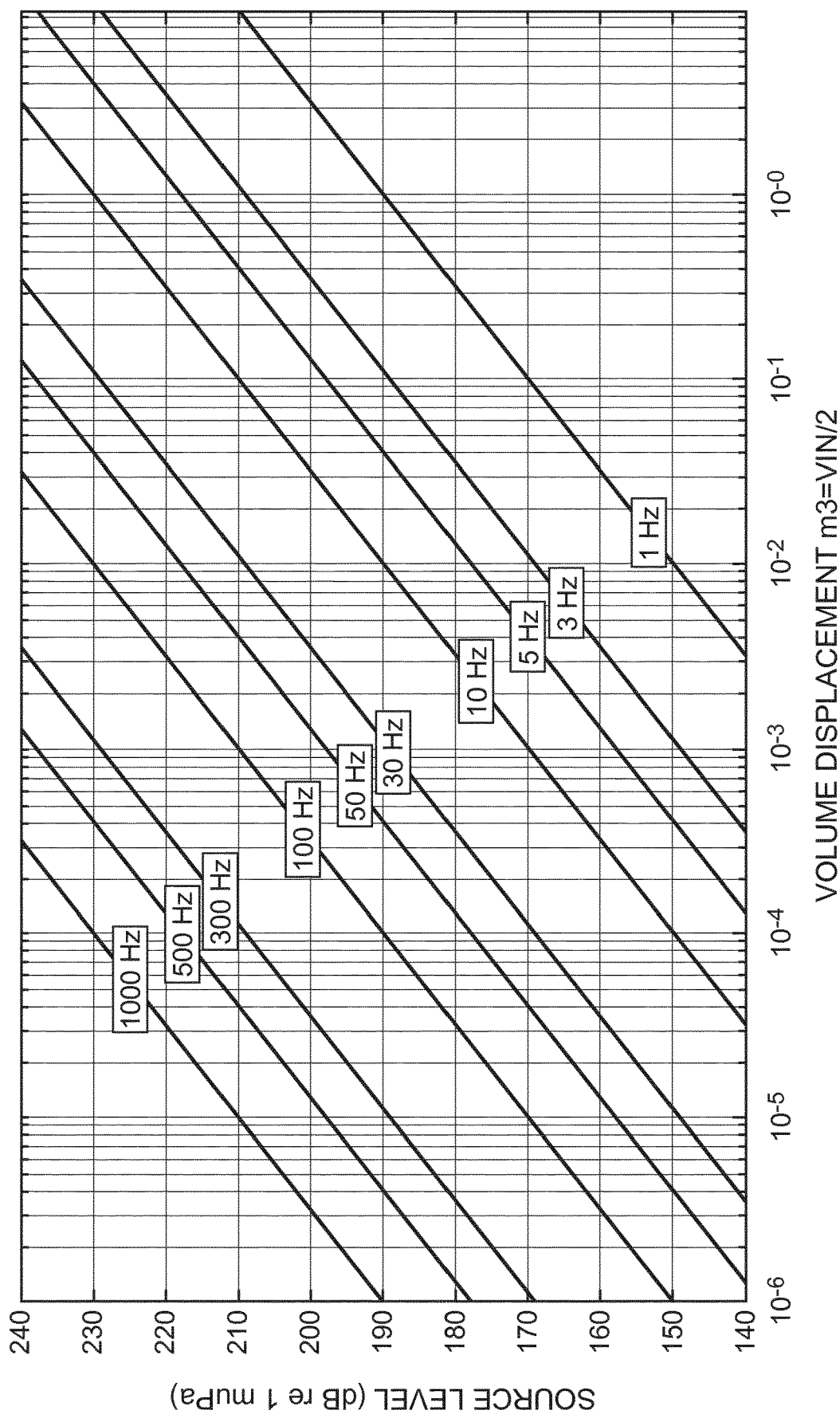
FIG. 11 shows a plot illustrating the emission level of a generated wave using the marine vibrator, as a function of volume displacement for different frequencies.

FIG. 11 shows a graph which gives the emission level versus the displaced volume of water for different frequencies. In other words, the intensity of a wave generated for a given frequency as a function of the volume of displaced water. The water volume for a given intensity increases as the frequency of the generated wave decreases. Indeed, for an intensity of 210 dB ref 1 µPa at 1 m, a 10 Hz wave requires 0.1 m³ of water to be displaced while a 3 Hz wave requires a volume of 1 m³. This is still below the intensity of acoustic waves generated by airguns which typically have an intensity of 220 dB ref 1 µPa at 1 m.

The invention claimed is:

1. A seismic marine vibrator comprising:
a plurality of first plates arranged along a longitudinal axis;
a plurality of second plates arranged along the longitudinal axis, the first plates alternating with the second plates;
longitudinal and peripheral first and second elements angularly distributed about the longitudinal axis and respectively secured to the first and second plates;
an actuator operable to reciprocate the first elements relative to the second elements along the longitudinal axis so as to reciprocate the first plates relative to the second plates;
peripherally closed air-filled chambers defined between respective first pairs of adjacent plates;
peripherally open chambers defined between respective second pairs of adjacent plates alternating with said first pairs of adjacent plates, the volume of said peripherally open chambers being varied when the first plates are reciprocated relative to the second plates so as to take in and expel water radially to generate an acoustic wave.

2. The seismic marine vibrator of claim 1, wherein the actuator is operable to reciprocate the first elements relative to the second elements at different frequencies within a predetermined frequency sweep over a distance which varies inversely of the frequency.

3. The seismic marine vibrator of claim 1, wherein at least one peripheral opening on the peripherally open chambers presents a symmetry of revolution with respect to the longitudinal axis.

4. The seismic marine vibrator of claim 1, wherein the plates of the first pairs and the plates of the second pairs are perpendicular to the longitudinal axis.

5. The seismic marine vibrator of claim 1, wherein the first and/or second plates present a curved wall delimiting the peripherally open chambers, and/or the first and/or second plates present a flat wall delimiting the peripherally closed air-filled chambers.

6. The seismic marine vibrator of claim 1, wherein the peripherally closed air-filled chambers comprise an elastic membrane.

7. The seismic marine vibrator of claim 1, wherein the diameter of one or more plates is higher than 40 cm and/or lower than 100 cm.

8. The seismic marine vibrator of claim 1, wherein the marine vibrator further comprises a base connected to the actuator, the second elements being fixed relative to the base, the actuator being configured to reciprocate the first elements relative to the base.

9. The seismic marine vibrator of claim 1, wherein the second plates are connected to the first elements and the first plates to the second elements.

10. The seismic marine vibrator of claim 1, wherein the first elements and/or the first plates comprise titanium, inox and/or rigid foam.

11. The seismic marine vibrator of claim 1, further comprising one or more ballasts.

12. The seismic marine vibrator of claim 1, further comprising one or more stabilizers.

13. The seismic marine vibrator of claim 1, further comprising a system for controlling the air pressure inside the peripherally closed air-filled chambers.

14. The seismic marine vibrator of claim 1, wherein the marine vibrator comprises a sensor configured for detecting acoustic waves.

15. A system comprising a surface autonomous vessel and the seismic marine vibrator according to claim 1, the autonomous surface vessel being configured for towing the seismic marine vibrator.

16. The system of claim 15, comprising a cable for supplying energy from the surface autonomous vessel to the actuator and conveying data between the vessel and the seismic marine vibrator.

17. The system of claim 15, further comprising a control unit including a communication unit for receiving at least one target frequency and for sending a command including a reciprocation frequency and a corresponding reciprocation distance to the one or more actuators, the control unit further including a processing unit coupled to the communication unit and configured for determining said reciprocation frequency and the corresponding reciprocation distance.

18. The system of claim 17, further comprising a sensor configured for detecting acoustic waves, the sensor being coupled to the communication unit, the determination of the corresponding reciprocation frequency including executing a control loop based on a frequency of one or more detected acoustic waves.

19. The system of claim 17, further comprising a memory having stored thereon a transfer function and/or a calibration table, the processing unit being coupled to the memory, the determination of the reciprocating frequency corresponding to a target frequency including converting the target frequency into the corresponding frequency based on the transfer function and/or the calibration table.

20. A method of producing acoustic waves in an aquatic zone, comprising:
   positioning at a depth of interest in said zone one or more devices each including:
      a plurality of first plates arranged along a longitudinal axis;
      longitudinal and peripheral first elements secured to the first plates;
      a plurality of second plates arranged along the longitudinal axis, the first plates alternating with the second plates;
      longitudinal and peripheral second elements secured to the second plates;
      peripherally closed air-filled chambers defined between respective first pairs of adjacent plates;
      peripherally open chambers defined between respective second pairs of adjacent plates alternating with said first pairs of adjacent plates; and
   reciprocating the first plates relative to the second plates at a frequency varied according to a predetermined sweep so as to take in and expel water radially to generate acoustic waves.

21. The method of claim 20, wherein several devices are provided and at least two devices generate acoustic waves with different source signatures.

* * * * *